(12) United States Patent
Gohman

(10) Patent No.: US 7,310,185 B2
(45) Date of Patent: Dec. 18, 2007

(54) DOUBLE PASS ILLUMINATION SYSTEM

(75) Inventor: Jeffrey A. Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/387,510

(22) Filed: Mar. 22, 2006

(65) Prior Publication Data

US 2007/0223113 A1    Sep. 27, 2007

(51) Int. Cl.
G02B 27/10  (2006.01)
G03B 21/56  (2006.01)

(52) U.S. Cl. .................. 359/618; 359/448
(58) Field of Classification Search ......... 359/242, 359/448–449, 453, 455–456, 618
See application file for complete search history.

(56) References Cited

U.S. PATENT DOCUMENTS

| | | | | |
|---|---|---|---|---|
| 5,260,798 A | * | 11/1993 | Um et al. ............. | 348/770 |
| 5,796,526 A | * | 8/1998 | Anderson ............. | 359/671 |
| 6,188,529 B1 | * | 2/2001 | Koyama et al. ....... | 359/738 |
| 2004/0061935 A1 | * | 4/2004 | Ohsako et al. ........ | 359/449 |
| 2004/0240053 A1 | * | 12/2004 | Shimoda ............... | 359/449 |
| 2007/0024811 A1 | * | 2/2007 | Piehl et al. ........... | 353/30 |

* cited by examiner

*Primary Examiner*—Scott J. Sugarman
*Assistant Examiner*—DaWayne A Pinkney
(74) *Attorney, Agent, or Firm*—Alleman Hall McCoy Russell & Tuttle LLP

(57) ABSTRACT

A display device is disclosed, wherein the display device comprises a light source configured to emit light, a projection lens configured to transfer the light to a display surface, at least one other optical element, and a lens disposed optically between the light source and the projection lens, wherein the lens is configured to enable a first transfer of the light from the light source to the at least one other optical element, and the lens is configured to enable a second transfer of the light from the at least one other optical element to the projection lens.

26 Claims, 2 Drawing Sheets

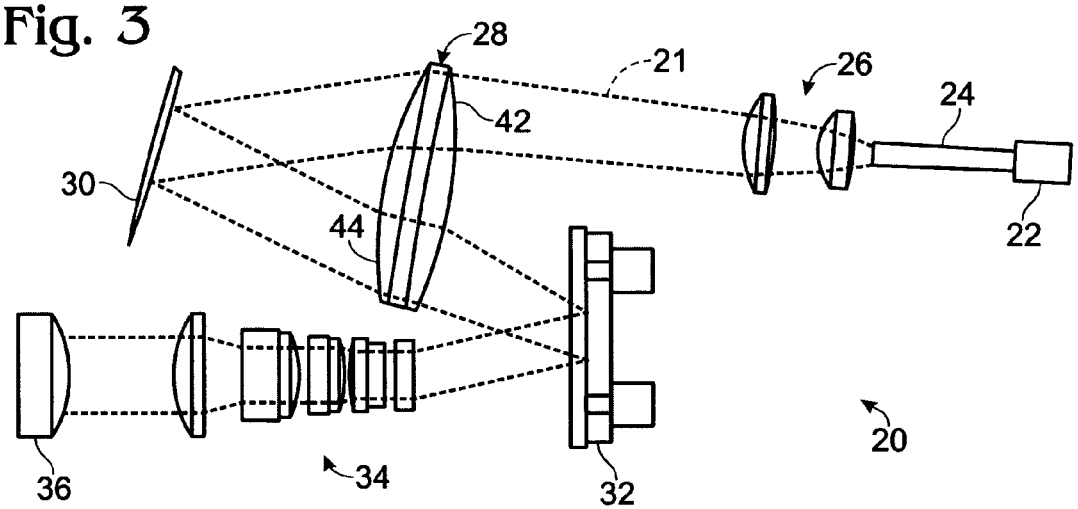

DOUBLE PASS ILLUMINATION SYSTEM

BACKGROUND

Projection devices including both front display and rear display systems generally include one or more optical elements. These optical elements may include lenses and redirecting elements such as mirrors for processing, redirecting, and focusing light onto a display surface. In some projection devices, a relay lens and mirror may be arranged within the light path to transfer and focus light received from a light source onto an image-producing element (such as a microdisplay) for image creation. The image-producing element may then be configured to redirect light toward a projection lens.

Some projection devices may be configured to have a reduced size along one or more dimensions compared to conventional devices. For example, thin rear projection devices are configured to have a reduced depth so that the display may be mounted to a wall or like surface. Likewise portable front projection devices may have reduced size along one or more dimensions for increased portability. However, the arrangement and size of the optical elements used in these devices may impose a lower limit on the dimensions of the devices. For example, the use of a single relay lens may allow the construction of a smaller or thinner projection device relative to the use of a pair of relay lenses. However, the power of the single relay lens may have to be increased to achieve the same optical effect as the pair of relay lenses. The higher power single lens may be larger and more expensive to construct, and may therefore limit the size and increase the cost of a projection device.

SUMMARY

One embodiment provides a display device comprising a light source configured to emit light, a projection lens configured to transfer the light to a display surface, a lens disposed optically between the light source and the projection lens, and at least one other optical element, wherein the lens is configured to enable a first transfer of the light from the light source to the at least one other optical element, and wherein the lens is configured to enable a second transfer of the light from the at least one other optical element to the projection lens.

BRIEF DESCRIPTION OF THE DRAWINGS

FIG. 3 shows a schematic diagram of a second exemplary embodiment of a double pass relay lens system for a display device.

DETAILED DESCRIPTION OF THE DEPICTED EMBODIMENTS

Figure 1:
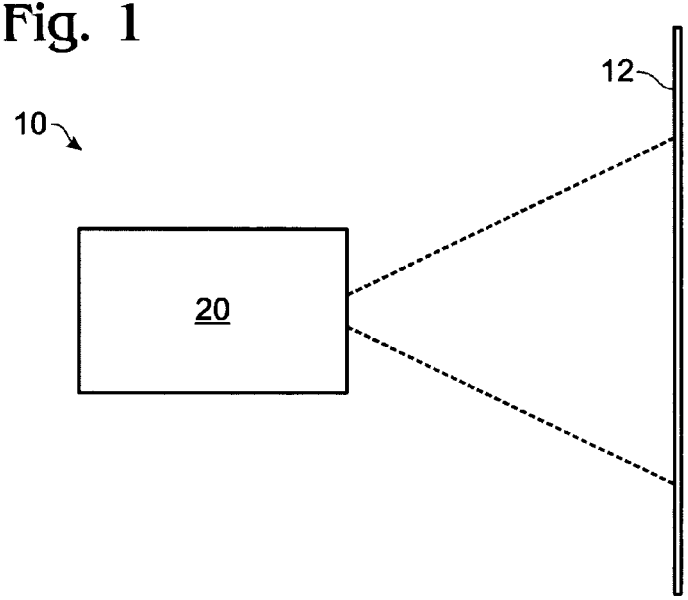
FIG. 1 shows a schematic diagram of an exemplary embodiment of a display device.

FIG. 1 shows a schematic diagram of an exemplary embodiment of a display device 10. Specifically, display device 10 generally includes an optical system 20 configured to produce an image for projection onto a display surface 12. Display device 10 may be configured as a rear projection display system, front projection display system, short-throw front or rear display systems, etc. In one specific embodiment, display device 10 may be a thin rear projection display system; however other display configurations are possible.

Figure 2:
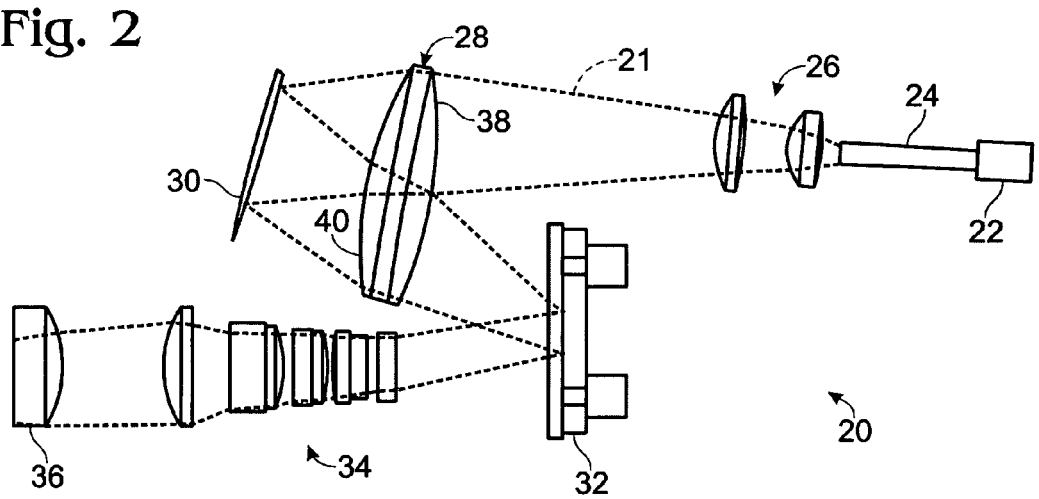
FIG. 2 shows a schematic diagram of a first exemplary embodiment of a double-pass relay lens system for a display device.

FIG. 2 shows, generally at 20, a first exemplary embodiment of an optical system for display device 10. Optical system 20 includes a light path 21 defined by a plurality of optical elements. The depicted optical elements include a light source 22 for producing a beam of light, a tunnel integrator 24 for reshaping and/or smoothing any intensity variations of the beam of light, a first lens group 26, a relay lens 28, and a reflector 30 for focusing the beam of light on an image producing element (for example, a microdisplay) 32, a second lens group 34, and a projection lens 36 for projecting the image from the microdisplay on a viewing surface. It will be appreciated that these elements are merely exemplary, and that optical system 20 may include any other suitable optical components, such as a color wheel or additional microdisplays for color display, etc.

As mentioned above, it may be desirable to minimize the size of display device 10 along one or more dimensions so that display device 10 occupies less space in a use environment. However, the dimensions of display device 10 may be limited by the optical requirements of the system. For example, a specific optical path length may be required to project an image of a desired size with a selected group of optical components. Shortening the optical path length within display device 10 may allow the device to be made smaller or thinner, but also may require the use of higher power optics. However, higher power optics may be more expensive to produce than lower power optics, and therefore may raise the cost of the display device.

Alternatively, instead of shortening the optical path, display device 10 may be made smaller by folding (or redirecting) the optical path. Folding the optical path may allow a longer optical path length to be achieved without increasing the dimensions of display device 10. However, problems may arise with optical components partially blocking the beam of light when utilizing a folded optical path due to space constraints within the system.

To overcome such problems, the embodiment of FIG. 2 utilizes a folded optical path in which light passes through relay lens 28 at least twice. Referring to FIG. 2, light from first lens group 26 passes through a first portion 38 of relay lens 28 and is then redirected by reflector 30 so that it passes through a second portion 40 of relay lens 28 before illuminating image-producing element 32. By passing light through relay lens 28 at least twice, a folded optical path may be achieved with the use of a lower-power relay lens than if light passed through relay lens 28 a single time or if light passed through two separate relay lenses. For example, relay lens 28 may be of approximately half the power of a relay lens through which light passes only a single time due to the double pass configuration. Furthermore, the use of a single relay lens 28 through which light passes at least twice may occupy less space than the use of two relay lenses in a folded optical arrangement.

In the embodiment of FIG. 2, first portion 38 and a second portion 40 of relay lens 28 may at least partially overlap, thereby further reducing the size of relay lens 28. In an alternative embodiment, the first portion and the second portion of the relay lens may overlap to a lesser degree, as shown in FIG. 3 at 42 and 44, respectively. By arranging first portion 38 and second portion 40 to overlap, the size of relay lens 28 may be reduced. Furthermore, reflector 30 may be located closer to relay lens 28, which may allow one or more dimensions of display device 10 to be further reduced. However, such a modification also may require image producing element 32 to be moved farther from relay lens 28 along at least one dimension to avoid partially blocking light passing from first lens group 26 to relay lens 28, and therefore may increase the size of display device 10 along this dimension. It will be appreciated that the degrees of overlap of the first and second portions of relay lens 28 shown in the depicted embodiments are merely exemplary, and that the first and second portions of relay lens 28 may have any suitable amount of overlap, including no overlap.

In some embodiments, reflector 30 may be disposed on an outer surface of relay lens 28 with the reflective material facing toward the lens surface. In other embodiments, the reflector may be disposed at least partially within relay lens 28. For example, the reflector may be formed on a rear surface of relay lens 28. Likewise, in some embodiments, a display device may include more than one double or multi pass lens.

Additional optical elements other than reflector 30 may be disposed along optical path 21 between the first and second passes through relay lens 28. Examples include, but are not limited to, lenses, filters, beam splitters, etc. Furthermore, while the double pass lens is disclosed herein as being a relay lens, it will be appreciated that the double pass lens may be any other suitable type of lens and may perform any other suitable function in optical system 20.

Although the present disclosure includes specific embodiments, specific embodiments are not to be considered in a limiting sense, because numerous variations are possible. The foregoing embodiments are illustrative, and no single feature, component, or action is essential to all possible combinations that may be claimed in this or later applications. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "a" or "a first" element or the equivalent thereof. Such claims should be understood to include incorporation of one or more such elements, neither requiring nor excluding two or more such elements. Further, ordinal numbers, such as first, second, and third, for identified elements or actions are used to distinguish between the elements and actions, and do not indicate a required or limited number of such elements or actions, nor a particular position or order of such elements or actions unless otherwise specifically stated. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A display device, comprising:
a light source configured to emit light;
a projection lens configured to transfer the light to a display surface;
a lens disposed optically between the light source and the projection lens;
a reflector configured to receive the light emitted by the light source via a first transfer through the lens and reflect the received light back to the lens without modulating the light to enable a second transfer of the light through the lens; and
an image-producing element including a microdisplay disposed optically between the lens and the projection lens such that the light interacts with the image-producing element optically downstream of the second transfer through the lens to produce an image.

2. The display device of claim 1, wherein the lens is disposed optically between the light source and the reflector.

3. The display device of claim 1, wherein the lens has a first portion configured to enable the first transfer of the light and a second portion configured to enable the second transfer of the light.

4. The display device of claim 3, wherein the first portion and the second portion of the lens at least partially overlap.

5. The display device of claim 3, wherein the first portion and the second portion of the lens do not overlap.

6. The display device of claim 1, wherein the image-producing element is configured to reflect the light from the second transfer toward the projection lens.

7. The display device of claim 1, wherein the reflector is configured to reflect the light received from a first portion of the lens toward a second portion of the lens.

8. The display device of claim 1, wherein the reflector and the lens are configured to create a folded optical path.

9. The display device of claim 1, wherein the display device is configured as a front projection display device.

10. The display device of claim 1, wherein the display device is configured as a rear projection display device.

11. The display device of claim 1, wherein the lens is a relay lens.

12. A display device, comprising:
a light source configured to emit light, wherein the light is unmodulated;
a redirecting element configured to redirect the unmodulated light;
a lens having a first portion configured to pass the unmodulated light emitted from the light source toward the redirecting element and a second portion configured to pass the unmodulated light received from the redirecting element; and
an image-producing element configured to receive the unmodulated light passed by the second portion of the lens;
wherein the image-producing element includes a microdisplay that is configured to produce an image from the unmodulated light received from the second portion of the lens.

13. The display device of claim 12, wherein the first portion and the second portion of the lens at least partially overlap spatially.

14. The display device of claim 12, wherein the first portion and the second portion of the lens do not overlap spatially.

15. The display device of claim 13, wherein the redirecting element is a reflector configured to reflect light received from the first portion toward the second portion of the lens.

16. The display device of claim 12, wherein the lens and the redirecting element are configured to create a folded optical path.

17. The display device of claim 12, further comprising a projection lens disposed optically downstream of the lens, wherein the projection lens is configured to project the light to a display surface.

18. The display device of claim 12, wherein the lens is a relay lens.

19. In an image display device, a method of displaying an image, comprising:
operating a light source to produce unmodulated light;
performing a first pass of the unmodulated light through a lens:
redirecting the unmodulated light;
performing a second pass of the unmodulated light through the lens; and directing the unmodulated light onto an image-producing element after performing the second pass of the unmodulated light through the lens;

wherein the image-producing element includes a microdisplay that is configured to modulate the unmodulated light to produce an image.

20. The method of claim 19, further comprising passing the light through a projection lens after performing the second pass of the light through the lens.

21. The method of claim 19, wherein redirecting the light includes redirecting the light with a reflector.

22. The method of claim 19, wherein the light passes through a first portion of the lens during the first pass and the light passes through a second portion of the lens during the second pass.

23. The method of claim 22, wherein the first portion and the second portion of the lens at least partially overlap spatially.

24. The method of claim 22, wherein the first portion and the second portion of the lens do not overlap spatially.

25. The method of claim 19, further comprising directing the light through a folded optical path.

26. The method of claim 19, wherein performing the first pass and the second pass through the lens comprises performing a first pass and a second pass of the light through a relay lens.

* * * * *